United States Patent
Goehlich et al.

(10) Patent No.: US 6,759,595 B2
(45) Date of Patent: Jul. 6, 2004

(54) OUTDOOR TERMINATION FOR A HIGH VOLTAGE CABLE

(75) Inventors: Lothar Goehlich, Berlin (DE); Claude Görk, Berlin (DE)

(73) Assignee: Pirelli Kabel und Systeme GmbH & Co. KG, Berlin (DE)

( * ) Notice: Subject to any disclaimer, the term of this patent is extended or adjusted under 35 U.S.C. 154(b) by 0 days.

(21) Appl. No.: 10/337,355

(22) Filed: Jan. 7, 2003

(65) Prior Publication Data

US 2003/0150639 A1 Aug. 14, 2003

(30) Foreign Application Priority Data

Jan. 7, 2002 (EP) .............................. 02000146

(51) Int. Cl.[7] ............................................ H01B 17/00
(52) U.S. Cl. ..................... 174/168; 174/19; 174/169; 174/176; 174/178; 174/211
(58) Field of Search .......................... 174/19, 168, 169, 174/176, 178, 211

(56) References Cited

U.S. PATENT DOCUMENTS

| | | | |
|---|---|---|---|
| 3,446,741 A | 5/1969 | Hervig et al. ................. | 252/63 |
| 4,943,685 A | 7/1990 | Reynaert ...................... | 174/19 |
| 5,969,291 A | 10/1999 | Bertazzi et al. ............ | 174/45 R |
| 6,031,187 A | 2/2000 | Giampieretti et al. ....... | 174/168 |

FOREIGN PATENT DOCUMENTS

| | | |
|---|---|---|
| DE | 2105892 | 9/1972 |
| DE | 19758099 A1 | 6/1999 |
| EP | 1091466 A1 | 4/2001 |
| EP | 1170846 A1 | 1/2002 |
| FR | 2194061 | 2/1974 |
| FR | 2210034 | 7/1974 |
| FR | 2357991 | 2/1978 |
| GB | 1440604 | 6/1976 |
| GB | 2336252 | 10/1999 |

*Primary Examiner*—Anthony Dinkins
*Assistant Examiner*—Jinhee Lee
(74) *Attorney, Agent, or Firm*—Finnegan, Henderson, Farabow, Garrett, & Dunner, L.L.P.

(57) ABSTRACT

The present invention relates to an outdoor termination for a high voltage cable, comprising an insulator body for receiving the high voltage cable; a filling compound provided within the insulator body and filling at least a portion of the space between the insulator body interior walls and the cable insulation; wherein said filling compound consists of a mixture of particles and an insulating compound; wherein said insulating compound is a crosslinked polymeric material with a DIN ISO hardness of 200 to 500 mm/10.

12 Claims, 4 Drawing Sheets

OUTDOOR TERMINATION FOR A HIGH VOLTAGE CABLE

CROSS REFERENCE TO RELATED APPLICATIONS

This application claims the priority of European Patent Application No. 02 000 146.7, filed Jan. 7, 2002, the content of which is incorporated herein by reference.

BACKGROUND OF THE INVENTION

1. Field of the Invention
2. Description of the Related Art

The present invention relates to an outdoor termination for a high voltage cable and a manufacturing method for such an outdoor termination.

Outdoor terminations for high voltage cables typically consist of an insulator body in which the high voltage cable with its insulated cable core is accommodated. The high voltage cable is typically insulated with a polymeric material and the interior of the insulator body must be filled with an insulating filling compound to provide the necessary insulation.

Figure 1:
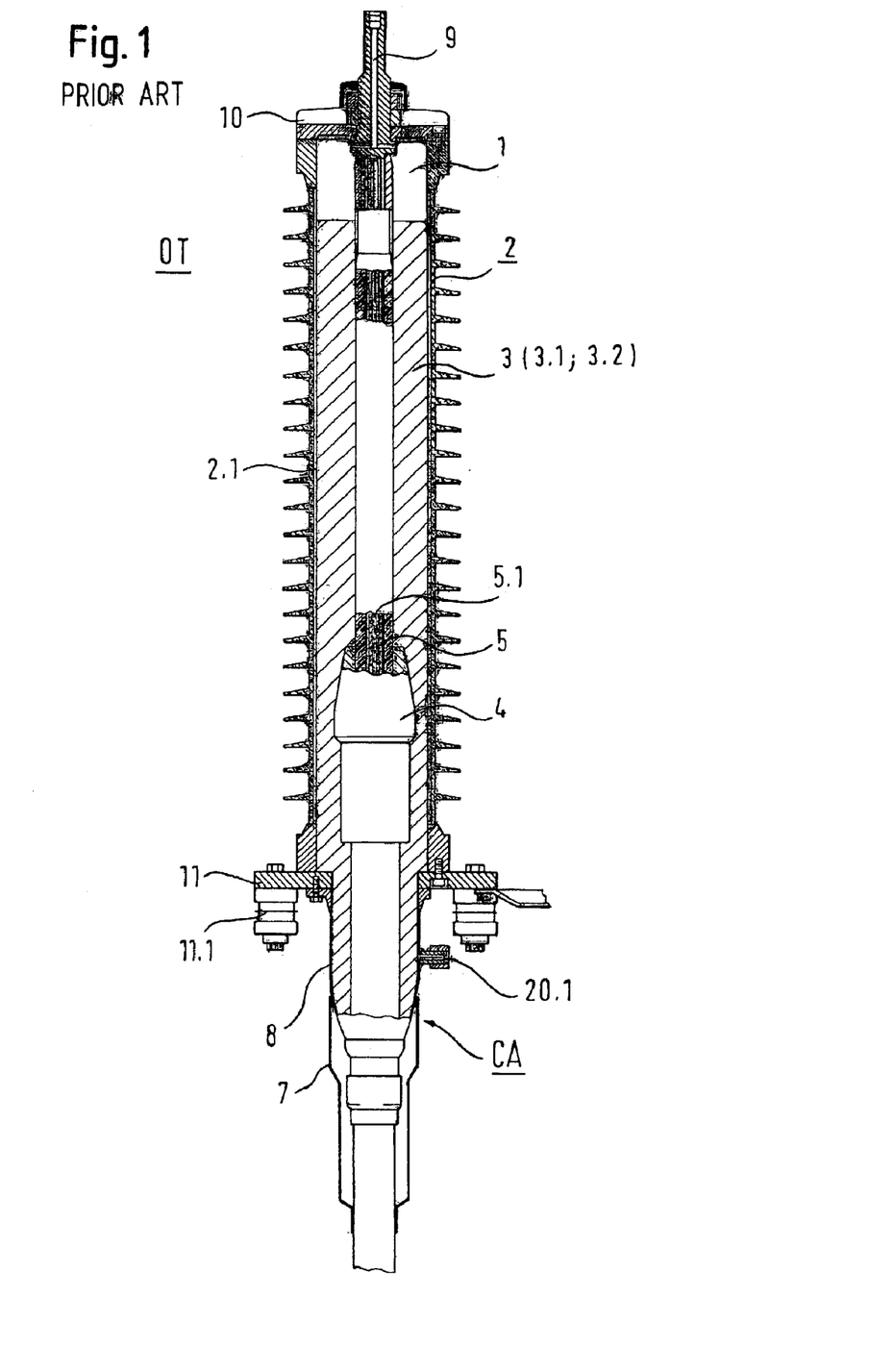
FIG. 1 shows an example of a first outdoor termination OT.

FIG. 1 shows a typical construction of a inventional outdoor termination OT. It comprises an insulator body 2 having an upper cover 10 and a lower cover 11, preferably made of metal, i.e. an upper metal work 10 and a lower metal work 11. At the upper metal work 10 a conductor stalk 9 is provided with which the cable core 5.1 is connected. The lower metal work 10 is also connected to the insulator body 2 at a bottom portion thereof, for example by means of nuts and bolts 11.1.

Within the interior of the insulator body 2 the cable CA extends wherein the cable core 5.1 is surrounded by an insulation 5, which is typically made from a polymeric material.

At the lower portion of the insulator body 2 the high voltage cable CA is surrounded by an antikinking protection 7 to avoid a breakage of the cable. Also provided at the lower metal work 11 (the base plate) there is an entrance bell 8 having a connector 20.1.

Through the entrance bell 8 the filling compound 3 can be injected into the interior of the insulator body 2 such that the filling compound 3 fills at least a portion of the space between the interior walls 2.1 of the insulator body 2 and the cable insulation 5. Typically the outdoor termination is mounted in a substantially upright position such that a cavity 1 is formed at an upper portion of the insulator body 2.

Furthermore, an electric field control means 4 in the form of stress cone 4 is provided at a lower portion of the insulator body 2 around the cable insulation 5 in order to appropriately set the electric field conditions inside the insulator body 2. Typically, the insulator body 2 is made of porcelain or is a composite insulator of reinforced epoxy resin and siliconee sheds.

The critical components in the outdoor termination OT shown in FIG. 1 are of course the upper and lower metal work 10, 11 and in particular the filling compound 3 itself, with respect to the liquid/gas-tightness and with respect to possible temperature fluctuations and pressure variations.

The filling compound 3, e.g. conventionally an insulating fluid, must possess the required dielectric properties and it must be chemically inert with respect to the material of the insulator body 2, the cable insulation 5 and the material of the stress cone 4.

The insulating liquids are quite expensive. It must in particular be observed that such outdoor terminations for high voltage cables comprise rather voluminous insulator bodies 2 such that a cost-intensive filling compound 3 will drastically increase the total cost of the outdoor termination OT. Typically, the outdoor termination is between 2 and 5 m long and its interior volume is between 50 and 1000 liters.

It must furthermore be considered that the outdoor termination OT is arranged in open space and thus exposed to all kinds of environmental influences, in particular large changes in temperature and/or large stresses due to snow or wind. Temperature changes cause changes in the volumina of the filling compound 3 accompanied by pressure changes. Even when large temperature changes occur, it must be avoided under all circumstances that a leakage occurs at the bottom part of the insulator body 2. On the other hand, when there is a large drop in temperature, it must be avoided that air is sucked into the cavity 1 at the top of the insulator body 2. Generally, it is accepted that the interior of the insulator body 2 must be protected against pressures of several bar.

To ensure that neither a leakage occurs at the bottom portion of the insulator body 2 nor air is sucked into the cavity 1, the insulator body 2 must be effectively sealed and this requires components with high precision. In turn, several mounting steps are necessary when mounting the outdoor termination OT in the environment and this adds to the cost of the outdoor termination OT.

Even after installing the outdoor termination OT regular maintenance must be performed since loss of insulating liquid can substantially influence the operating characteristics of the outdoor termination.

Thus, on the one hand the substantial amount of expensive insulating liquid 3 increases the cost of the outdoor termination and on the other hand the provision of a liquid inside the insulator body 2 requires complicated mounting steps and requires regular maintenance. This applies to all high voltage cables CA, not only plastic insulated high voltage cables.

A conventional solution to reduce the cost of the outdoor termination OT is to attempt-to reduce the amount of necessary insulating fluid 3. For example, insulator bodies 2 have been suggested which have a tapered shape towards the upper portion of the insulator body 2 such that the interior volume of the insulator body 2 is decreased. In principle, this is possible because the electric field strength decreases towards the upper portion of the insulator body 2. Whilst in this manner the interior volume of the insulator body 2 can be decreased to some extent, on the other hand the manufacturing of a tapered insulator body 2 again increases the cost.

The maintenance work is essentially caused by the filling compound 3 being in a liquid state. Thus, conventionally also outdoor terminations OT have been suggested that do not require the use of an insulating fluid inside the insulator body 2. Three different possibilities have been investigated:

A first example is an outdoor termination where a rubber-elastic insulating body including an integrated stress cone is pressed into a solid insulating casing which is connected with an insulator and central conductor. Whilst the rubber-elastic insulating body provides the necessary electric insulation, this construction requires several components whose dimensions must be matched very accurately. This leads to high costs and requires several manufacturing steps also leading to an increase of the costs. Whilst the use of an insulating liquid is not necessary, on the other hand the assembly is rather rigid and thus does not easily allow some movement due to winds and short-circuits.

A second example uses a rubber-elastic or heat-shrinkable insulating sleeve. This leads to a less rigid assembly which cannot tolerate the above mentioned mechanical impacts.

A third example is suggested in "Elektrizitätswirtschaft, Jg. 99 (2000), Heft 11: Trockene Freiluftendverschlüsse mit Stützeigenschaften" by R. Eitle and J. Kaumanns. Here, a dry rigid type outdoor termination is suggested. The solution presented here comprises a siliconee-based liquid insulating material which cross-links in the outdoor termination only after having been filled in. The insulating material is compressible. This property is achieved by "micro-spheres" with which the insulating material is filled. These "micro-spheres" are hollow and filled with gas. They have a size of about 100 $\mu$m. The "micro-spheres" serve as compensating volumina. Thus, even at extreme temperature changes no damages due to cracks or gaps are caused. Furthermore, the solid insulation material has some electrical properties.

However, even in the third example with the cross-linking siliconee-based material, there are disadvantages. Firstly, the cross-linking polymer is prepared on the basis of a siliconee elastomer and spheres are hollow and are filled with gas. The thermal conductivity of the siliconee elastomer is about 60 mW/mK and is thus only about 20% of the usual filling compound used in conventional outdoor terminations. For compensating this low thermal conductivity an increase of temperature must be avoided. Therefore, an additional heat compensating conductor having a large cross section needs to be mounted and this measure is very complicated and thus increases the costs.

A second disadvantage is the high viscosity of 17.000 mPa·s. Such a material cannot easily be inserted into the interior of the insulator body such that either large pressures are caused or long filling times are necessary. Therefore, the assembly of this type of outdoor termination is complicated (requires many different tools) and a large time is needed for the assembly.

The "micro-spheres" are hollow and are filled with gas in order to provide a compensating volume, for example during temperature changes. On the other hand, the gas in the hollow cavities in an insulating medium present a higher risk even if practical measurements of the partial discharge intensities are lower than 1 pC. Furthermore, there is a risk that the gas gradually diffuses into the surrounding insulating material of siliconee elastomer and that thus the pressure in the cavities is reduced. This reduction of pressure in the cavities also causes a decrease of the ignition voltage for partial discharges. Thus, partial discharges even at the normal operating voltage can take place and can destroy the dielectric.

As explained above, the conventional outdoor terminations are either very cost-intensive and complicated to assemble since in the case of using a liquid insulating fluid measures need to be taken to avoid leakages of the fluid which in turn also causes a high maintenance effort. On the other hand, a filling compound consisting of micro-spheres and a cross-linking material on the basis of a siliconee elastomer where the micro-spheres are filled with gas avoids the leakage problems but causes additional problems of possible partial discharges and/or the need for providing additional heat conductors.

Therefore, the object of the present invention is to provide an improved outdoor termination and a method for making the same which can reduce the cost of the outdoor terminations without having the risk of partial discharges and damages to the dielectric. At the same time it is contemplated to provide an outdoor termination which allows for adjusting the electrical properties according to individual needs.

SUMMARY OF THE INVENTION

This object is solved by an outdoor termination for a high voltage cable, comprising an insulator body for receiving the high voltage cable, a filling compound provided within the insulator body and filling at least a portion of the space between the insulator body interior walls and the cable insulation wherein said filling compound consists of a mixture of a particulate material and an insulating compound.

Furthermore, the present invention also pertains to a method for making an outdoor termination for a high voltage cable comprising the following steps: preparing an insulator body for receiving the high voltage cable, inserting the filling material into the insulator body to fill at least a portion of the space between the insulator body interior walls and the cable insulation, wherein said filling material is prepared as a mixture of solid particles and an insulating compound, wherein in a first step said solid particles are inserted in said insulator body, in a second step said insulating compound is inserted into the insulator body, wherein said solid particles and said insulating compound are mixed.

In accordance with the invention, the filling material is prepared as a mixture of solid particles and an insulating compound. The term solid particles throughout this description and the claims denotes particles without gaseous inclusions, i.e. solid particles according to the present invention are not hollow particles. Because of the solid nature of these particles, the problems of partial discharges due to a possible gas leakage as in the prior art are avoided.

The solid particles according to the present invention may be made from any suitable solid insulating material. Such materials may be of an organic or inorganic nature. However, generally speaking organic particles are preferred in view of their mechanical stability. That is, inorganic materials, such as glass or ceramic materials may readily suffer from fracture and thus impact the mechanical and electrical properties of the filling compound. This is particularly true of inorganic particles in shapes other than spherical shapes.

Particularly preferred are polymeric materials, such as high, medium and/or low polyethylene particles of various degrees of cross-linking. PTFE, PVC, polypropylene and/or rubber particles can also be used.

The particles may have a variety of shapes, whereby shapes without sharp edges are preferred. Thus, generally speaking, pellet or ball shapes are preferred. However, cubic and flat shapes may also be useful. The preference of pellet- or ball-like shapes is also due to the fact that the present invention aims at filling the insulator body as uniformly as possible. That is, the aim is to provide the particles and surround the particles with the insulating compound. This aim can best be fulfilled when the particles are of a substantially ball-like shape as the interstices between ball-like particles can be filled with the insulating compound more easily than e.g. in the case of particles with a flat shape.

As far as the size of the particles is concerned, the general dimensions of the particles should be adapted to the overall design of the outdoor termination and the required insulating properties. Generally speaking, however, it is preferred to use particles with a size of 1–5 mm, whereby sizes in the range of 1–3 or 1–4 mm are particularly preferred. The term "size of the particles" in the context of the present invention means that the particles satisfy the afore-mentioned requirements in all three dimensions.

In a preferred embodiment of the present invention, the particle size distribution is narrow in the sense that all particles are substantially of the same size. That is, the majority of the particles is within ±20%, preferably ±10% or even ±5% of the average particle size. The majority here means 70% of the particles or more, preferably 80% of the particles or more and most preferably 90% of the particles or more.

In a further preferred embodiment of the present invention, blends of 2 of 3 particles of different sizes are used. The resulting bi- or tri-modal particle size distribution has the advantage that the amount of space in the insulating body occupied by the particles can be increased in comparison to a filling which uses only particles of one size. For instance, if the insulating body is filled with spherical particles, the maximum volume occupied by these spheres is approximately 60%, the rest being void volume. With a mixture of spheres containing larger spheres and smaller spheres, whereby the diameter of the smaller spheres corresponds to approximately 40% of the diameter of the larger spheres, the 60% volume coverage achieved with the larger spheres can be increased by approximately 7%. In this context, it may also be particular advantageous to use mixtures of particles with various shapes. For instance, if a mixture of larger spheres and cubes with an edge length that corresponds to 40% of the diameter of the larger spheres is used, a volume coverage of more than 70% can be achieved. In this context, cylindrical shapes and the like may also add to a high volume coverage of the particulate materials.

The insulating compound used in the present invention is a cross-linkable polymeric material. Prior to the crosslinking, the insulating compound needs to be liquid enough to allow for easy filling of the insulator body. Accordingly, its viscosity in the non-cross-linked state should preferably not exceed 2000 mPas (Brookfield) at 23° C., preferably its viscosity is below 1500 mPas, and most preferably its viscosity is in the range of 700 to 1000 mPas.

The density of the insulating compound is not subject to any particular limitation. However, usually the density is in the range of 0.95 to 1.1 g/cm$^3$ in the non-cross-linked state.

The present invention contemplates that the insulating compound is filled into the insulator body in addition to the above particulate material. Once the insulating compound is filled into the insulator body, it undergoes a cross-linking reaction, so as to form a soft matrix surrounding the particulate material and the cable. Accordingly, the insulating compound is a cross-linkable compound, which upon cross-linking should exhibit the necessary electric properties and be of a soft, gel-like consistency. The softness of the cross-linked insulating compound is desirable, as it allows for the compensation of mechanical stress on the insulating filling.

Typically, the insulating compound upon cross-linking and in the absence of the particulate material has a hardness according to DIN ISO 2137 of 200 to 500 mm/10, preferably 250 to 400, and most preferably 290 to 350 mm/10. Very good results have been obtained with insulating compounds which exhibit a hardness upon cross-linking of 310 to 350 mm/10.

After the cross linking the viscosity of the insulating compound under all operating conditions, e.g. from —40° to 100° C., is such that in can be permanently contained in the insulator body without necessitating gas- or liquid-tight seals. In other words, the cross linked insulating compound forms a soft but solid body. It moreover, at least in admixture with the particulate material has no apparent and measurable viscosity.

In order to further reduce mechanical stress, it is also desirable at the thermal conductivity at 20 to 150° C.

according to DIN 52612 is in the range of 0.15 W/mK to 0.3 W/mK, particulary preferred are thermal conductivities around 0.2 W/mK.

For the same reason it is also preferred that the coefficient of linear expansion of the insulating compound in the crosslinked state is small, i.e. in the range of 200×10$^{-6}$ m/mK to 400×10$^{-6}$ m/mK, preferably between 300×10$^{-6}$ m/mK and 350 m/mK.

In terms of the electrical properties, the dielectric strength (1 mm sheet, IEC 243-2) should be in the range of 18 to 30 kV/mm, whereby values between 20 and 25 KV/mm and in particular values around 23±10% KV/mm are preferred.

The volume resistivity measured at 23° C. according to DIN IEC 93 should preferably be in the range of $5 \times 10^{15}$ to $5 \times 10^{-16}$ Ωcm. Very good results have been obtained with insulating compounds having a volume resistivity of $10^{16} \pm 10\%$ Ω.

It is also preferably that the relative permittivity of the insulating compound upon cross linking (VDE 030 T4, 50 Hz) should be between 2.5 to 3, preferably between 2.7 and 2.9.

Insulating compounds of the above type can be of diverse chemical structure. The common demoninator, of course, is that they should be capable of being cured in the insulator body and satisfy the above requirements particularly in regard to the softness. The curing may thereby be effected according to various methods known in the art. However, addition curing processes that proceed at ambient temperature are preferred.

Preferred insulating compounds are modified hydrocarbons, such as polybutadiene modified polyolefins and silicone polymers.

Preferred silicone-based insulating compounds can be derived from a first silicone component with the following chemical structure:

wherein $R^1$, $R^2$, $R^3$, $R^4$, $R^5$ and $R^6$ independently represents alkyl groups with 1 to 5, preferably 1 to 3 carbon atoms or phenyl groups, m and n represent integers other than zero and the ratio of m to n is in the range of 0.01 to 1 preferably in the range of 0.05 to 0.5 and most preferably in the range of 0.1 to 0.5.

Compounds of this type can be cross-linked with a second silicone based component of the following formula:

wherein $R^1$, $R^2$, $R^3$ and $R^4$ are defined as above and wherein p represents an integer that is different from zero, preferably an integer of 1 to 50, more preferably an integer of 1 to 20 and most preferably an integer of 1 to 15.

The ratio of the silicone hydride compound to the vinyl group containing silicone is usually in the range of 0.3 to 1 and preferably between 0.5 and 0.8. Accordingly, the mechanical properties of the insulating compound can best be adjusted by choosing a suitable number of vinyl groups in the above vinyl group containing silicone polymer.

The cross-linking of these two components can be effected by methods known in the art. A preferable method to effect the hydrosilitation is to use noble metal catalysts and in particular platinum catalysts, such as metallic platinum, which may be used on a support, platinum salts and chloro platinum acid as well as respective complexes.

The amount of catalyst to be used for the hydrosililation cross-linking reaction is not particularly limited. However, usually 5 to 100 mg noble metal catalyst per kg vinyl component is advisable. The amount of platinum catalyst should reflect a compromise between the costs for the noble metal catalyst and the desired curing time.

In one embodiment of the present invention, the insulating compound should be chosen as such that it adheres both the particulate material and the interior walls of the insulator body. This may either be effected by chemical bonds, which may be formed in the course of the cross-linking reaction or by physical forces, namely by choosing a material with a particular tackiness.

In another embodiment, the particles are electrically conducting, for example made from conductive polyethylene. The solid particles may also be provided with a thin film to reduce the surface tension. The thin film can be a thin layer of a silicone oil. It is also preferred that the solid particles are made of a low smoke toxic-free material.

It should be noted that the present disclosure only reflects what the inventors presently conceive as the best mode of the invention and that further variations and modifications of the invention may be carried out on the basis of the teachings contained herein. In particular, the invention comprises embodiments consisting of combinations of features which have been separately described in the description and/or in the claims.

BRIEF DESCRIPTION OF THE DRAWINGS

In the drawings the same or similar reference numerals denote the same or similar parts and steps throughout.

DETAILED DESCRIPTION OF THE INVENTION

It should be noted that hereinafter the invention is described with respect to possible materials which can be used for manufacturing an outdoor termination for a high voltage cable. However, it should also be noted that in principle the filling compound in accordance with the invention may similarly be used as a dielectric for other insulation purposes, e.g. in telecommunication cables or in other environments where a high voltage insulation must be provided.

FIG. 1 shows an outdoor termination OT which can be used with the invention. It comprises, as described above, an insulator body 2 with some insulator body interior walls 2.1, an upper metal plate 10 (an upper metal work), a base plate (lower metal work) 11, a conductor stalk 9 and optionally an electric field control means 4 in the form of a stress cone 4.

It should be noted that in some embodiments of the invention the stress cone 4 may not be needed and therefore it may only be additionally provided. For example, the electric field control means, i.e. the stress cone 4, may in particular be disposed of if the high voltage cable CA is a DC cable made of siliconee carbide.

As described above, within the insulator body 2 the high voltage cable CA shown with its insulation 5 is received. A preferred embodiment for the material of the insulator body 2 is a composite material or porcelain. Typically, the insulator body 2 is made of porcelain or is a composite insulator of reinforced epoxy resin and siliconee sheds.

A filling compound 3 is provided within the insulator body 2 and fills at least a portion of the space between the insulator body interior walls 2.1 and the cable insulation 5 such that a cavity 1 is formed at the upper portion of the insulator body 2 where the connection between the cable core 5.1 and the conductor stalk 9 is made. The filling compound preferably fills 80% or more, more preferably 90% or more and most preferably 95% or more of the volume of the insulator body.

Figure 2:
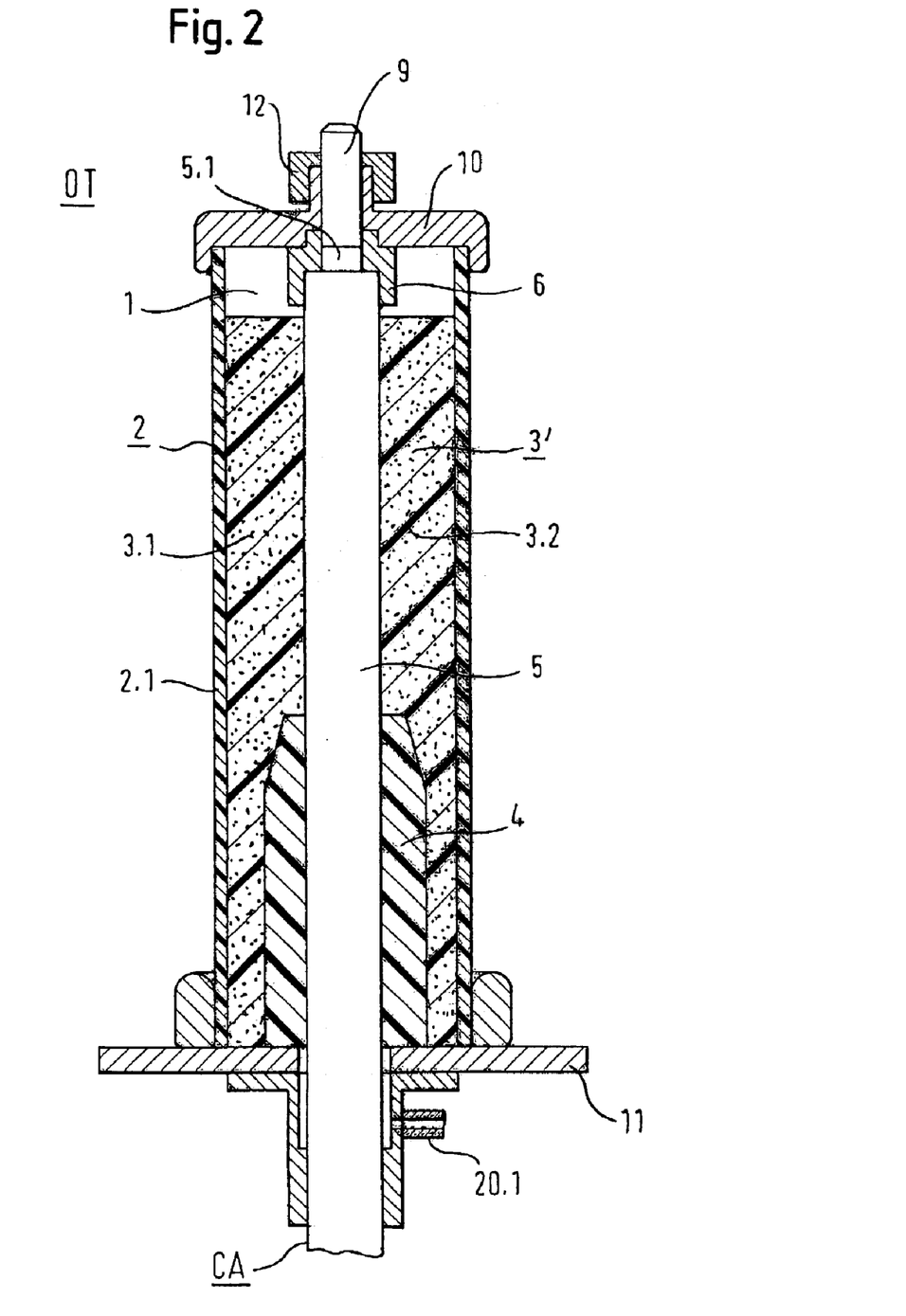
FIG. 2 shows an example of a second outdoor termination OT.

FIG. 2 shows the second embodiment of the outdoor termination OT in accordance with the invention. It comprises, similarly as the outdoor termination OT in FIG. 1, an insulator body 2 with some insulator body interior walls 2.1, an upper metal plate 10 (an upper metal work), a base plate (lower metal work) 11, a conductor stalk 9 and optionally an electric field control means 4 in the form of a stress cone 4. It should be noted that also in the second embodiment of the invention in FIG. 2 the stress cone 4 may not be needed and therefore it may only be additionally provided. Furthermore, the outdoor termination OT in FIG. 2 comprises a sealing element 6 and some upper fixing means 12, e.g. a nut.

As in FIG. 1, also in FIG. 2 within the insulator body 2 the high voltage cable CA shown with its plastic insulation 5 is received. A filling compound 3' is provided within the insulator body 2 and fills at least a portion of the space between the insulator body interior walls 2.1 and the cable insulation 5 such that a cavity 1 is formed at the upper portion of the insulator body 2 where the connection between the cable core 5.1 and the conductor stalk 9 is made. As schematically shown in FIG. 2, the filling compound 3' consists of a mixture of solid particles 3.1 and the insulating compound 3.2. Thus, the outdoor termination OT in accordance with the invention consists of an outer insulator body 2 and an inner insulating compound 3', wherein the outer insulator 2 may be formed of a compound insulator, for example porcelain, as in a conventional outdoor termination OT and the inner filling compound 3' is a mixture of solid insulating particles 3.1 and an insulating compound 3.2.

As in the first embodiment a preferred material for the solid particles 3.1 is polyethylene, polyvinylchlorid (PVC) and rubber. The solid insulating particles should preferably completely and evenly fill at least a portion of the space between the insulator body interior walls 2.1 and the cable insulation 5 and possibly, if provided, between the stress cone 4. Only the upper cavity 1 is not filled by the inventive filling compound 3'. The upper cavity preferably only accounts for 20% or less, more preferably 10% or less and most preferably 5% or less of the volume of the insulator body.

As in the first embodiment, the solid particles 3.1 may be made of low smoke toxic-free material.

As in the first embodiment, the solid insulating particles 3.1 are not hollow and should preferably be free of inclusions of any foreign matter.

In the second embodiment of the invention shown in FIG. 2 as insulating compound 3.2 an insulating fluid is used which is only in a liquid-state when it is inserted into the insulator body 2. This insulating compound 3.2 is a cross-linking capable material which forms a resin of a gel-like consistency after the cross-linking. Such an insulating compound is first in a liquid state over a predetermined time and cross-links after the insertion into the insulator body which has already been filled with the solid particles, e.g. PE-pellets.

The cross-linking is such that the material forms a matrix which is cross-linked and spreads (wets) the solid particles 3.1 and preferably also the insulator body interior walls 2.1 and the cable insulation 5. That is, the cross-linking capable material, after being filled in the insulator body interior as a liquid, undergoes a cross-linking reaction. Preferably, the material also performs a spreading (e.g. wetting) of the interior walls 2.1, of the cable insulation 5 and, if provided, of the stress cone surface 4. Thus, due to the spreading, the cross-linked material somewhat adheres to the interior surface 2.1, the cable insulation 5 and possibly the stress cone surface 4. However, when temperature changes occur, which cause the cross-linked material to more, the cross-linked material should be released from the respective surface so as to relieve the mechanical stress.

It is also possible that the material in the course of the cross-linking reaction also forms chemical bonds with the particles 3.1 and preferably also with the interior walls 2.1, the cable insulation 5 and the stress cone surface 4 (if provided).

After the cross linking, the viscosity of the cross-linked insulating fluid is so large that permanent seals in particular in the lower portion of the insulator body 2 can be disposed with or the sealing construction can at least be made simpler by contrast to the conventional outdoor terminations. There is no necessity for an absolute sealing at the lower portion. For example, the seals must only provide a temporary sealing function as long as the insulating fluid has not been fully cross-linked with the particles or preferably also with the interior walls and the cable insulation.

The number of manufacturing steps for making such an outdoor termination is drastically reduced. Since the filling compound of the outdoor termination is formed of a cross-linked gel-like material with a very high viscosity, a leakage as in conventional outdoor terminations is no longer possible and the checking of the inner insulation of the outdoor termination over its lifetime is no longer necessary.

It should be noted that in particular the combination of the cross-linked insulating compound with solid particles which provides a major advantage of reducing the costs whilst still enabling that temperature changes do not cause damage to the outdoor insulation. That is, the viscosity of the insulating compound upon cross linking is so low that a heat induced volume change can take place.

A further advantage of the present invention resides in the fact that depending on the particulate material, the size of the particles and the amount of the particulate material one may adjust the electrical properties of the insulation and thus those of the OT according to individual needs.

For example, one important aspect of the filling material is its ability of conducting the heat produced by the cable to the outside. This property is inter alia dependent on the thermal resistivity of the insulating material. The specific thermal resistivity of silicone polymers is approximately 5 Km/W and that of e.g. ceramic is only 0.9 Km/W. Accordingly, a mixture of 40% silicone and 60% ceramic only exhibits a thermal resistivity of 2.5 Km/W and thus only 50% of the value for the pure silicone polymer and only 33% of that of a conventional outdoor termination.

Choosing a suitable particulate material also allows for adjusting and substantially reducing the thermal expansion of the insulating filling. Accordingly, the construction of the outdoor termination according to the present invention can be substantially simplified, as it no longer needs to pay particular attention to the thermal expansion of the insulating material.

In addition, the insulating material according to the present invention also allows for a significant improvement of the dielectric strength of the insulating material. The dielectric strength of pure silicone polymer is approximately 2.8 and that of polyethylene 2.2. Thus, a mixture of 60% polyethylene particles and 40% silicone polymer has a dielectric strength of 2.4. Because of the relationship of the strength of the electric field and the relative permittivity, the electric field in the afore-mentioned mixture is substantially changed in comparison to a pure silicone insulation. That is, in the silicone phase, the electrical field is reduced to 86% in comparison to a pure silicone insulating material (reference value 100%) and in the polyethylene particles the electrical field is increased to 109%. This means in practice, that the electrical potential can be substantially increased in comparison to a pure silicone insulating, i.e. it can be increased to a potential where the electrical field in the silicone phase again amounts to 100%. As the dielectric strength of polyethylene is substantially higher than that of silicone, the simultaneous increase in the electrical field in the polyethylene particles immaterial.

For improving the electric field control it may also be preferred that the solid particles have special electrical or dielectric properties. For example, it may be preferred that the solid particles are electrically conducting and have a predetermined dielectric constant. The solid particles may be made from conductive polyethylene. For example, for the particles a conductive polyethylene with a specific resistance between $10^8$ and $10^{10}$ $\Omega$cm may be used. This may cause a reduction of the diameter of the outer insulator body 2 as a consequence of the improvement of the electric field control by evenly distributing the voltage on the insulator body interior walls 2.1 and the adjacent air cavity 1.

Furthermore, it may be noted that the solid particles 3.1 may be provided with a thin film in order to reduce the surface tension. To reduce the surface tension, preferably the thin layer may be made of a silicone oil. If a thin layer is used, then this can cause an easier movement of the pellets with respect to each other and with respect to the insulating fluid or the gel material which forms the spaces between the particles.

Figure 3A:
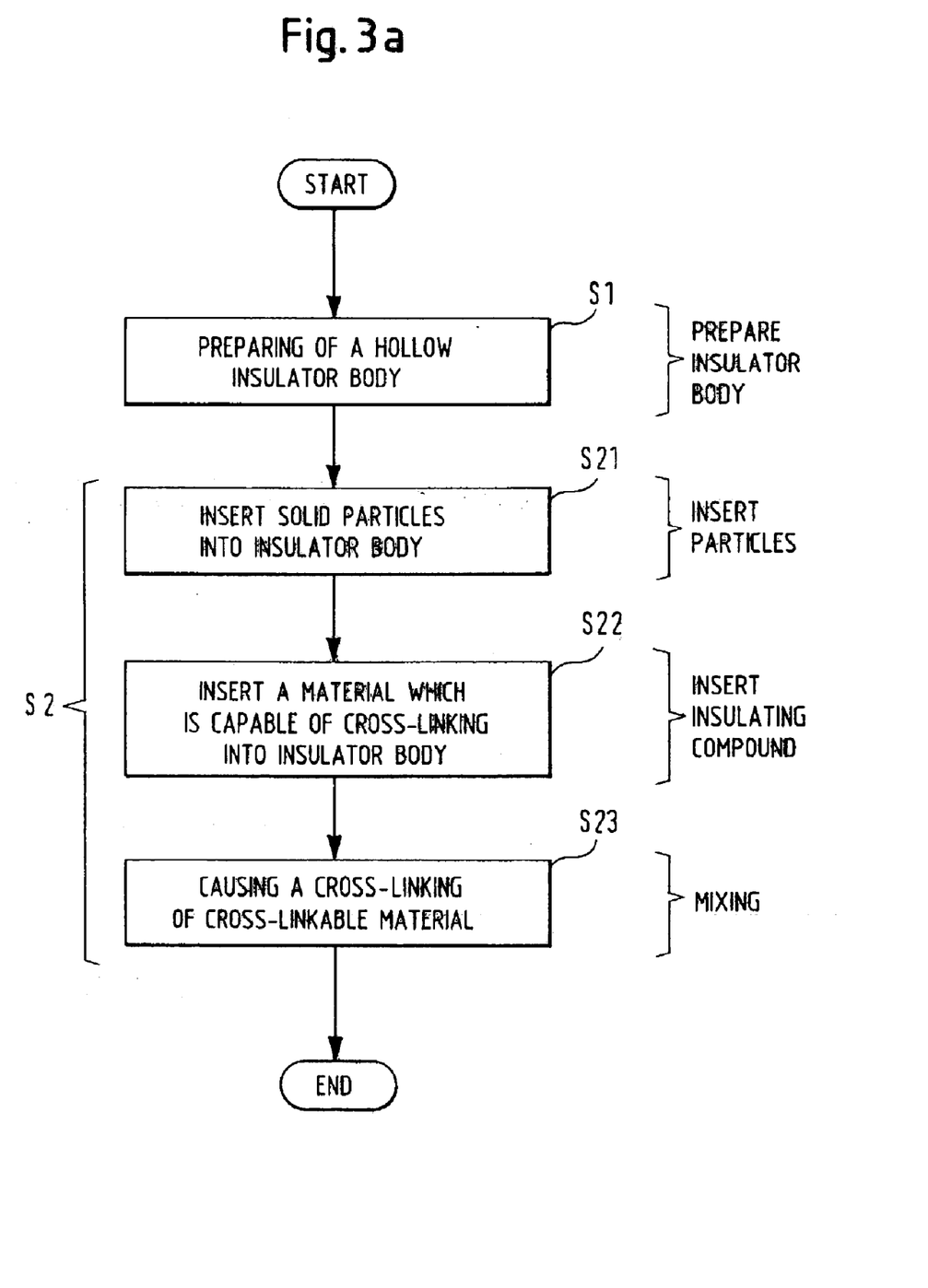
FIG. 3a shows a flowchart for manufacturing an outdoor termination OT in accordance with the invention.
Figure 3B:
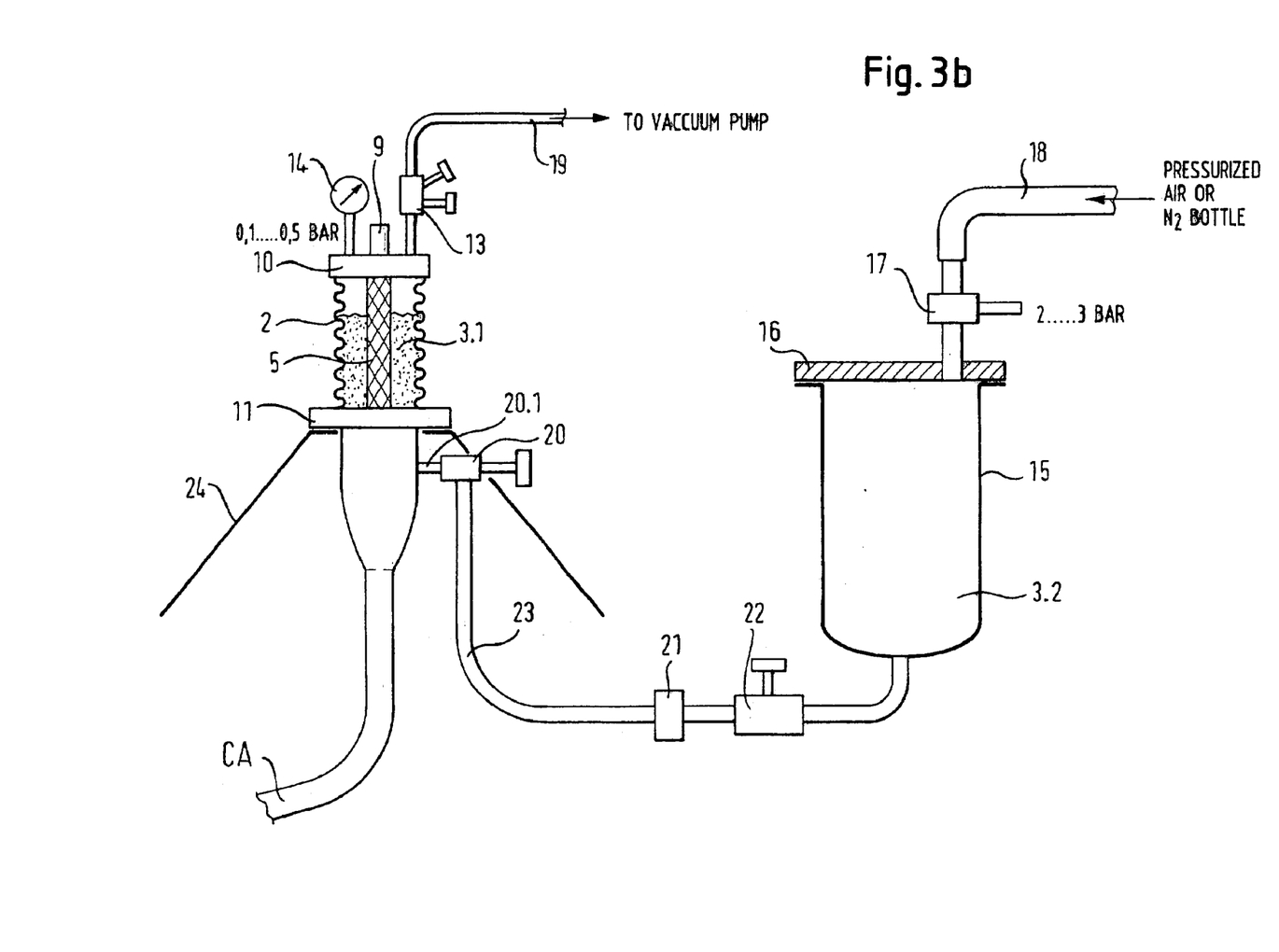
FIG. 3b shows an overview of an arrangement for inserting an insulating compound, in particular a cross-linking capable material, into the interior of an insulator body, in accordance with the invention.

FIG. 3a shows an embodiment of the method in accordance with the invention for manufacturing an outdoor termination OT. FIG. 3b shows an apparatus for filling an insulating fluid into the insulator body interior.

In step S1 a hollow insulator body 2 with the parts as shown in FIG. 1 and FIG. 2 necessary for the electrical functioning of the outdoor termination is prepared. That is, all the elements 1, 2, 2.1, 3, 4, 5, 5.1, 6, 7, 8, 9, 10, 11, 11.1 are arranged such that the high voltage cable CA is provided with its inner insulation 5 inside the insulator body 2. As shown in FIG. 3b, the outdoor termination OT with its attached high voltage cable CA is arranged on a support 24 in a vertical arrangement.

In a second step, the filling compound 3' must be prepared as a mixture of solid particles 3.1 and as an insulating compound 3.2 within the interior of the insulator body 2. First, the solid particles are filled into the insulator body 2 from above, for example to a level as indicated in FIG. 3b, e.g. filling about 90% of the interior of the insulator body 2 such that only a predetermined space, e.g. a cavity, 1 is left at an upper portion of the insulator body 2.

Container 15 holds the insulating compound 3.2. In a second step S2 the insulating compound 3.2 is inserted into the insulator body 2, wherein the solid particles 3.1 and the insulating compound 3.2 are mixed.

Preferably, in step S22 the insulating compound is fed from the container 15 to the insulator body 2 interior via a tube 23 through valves 21, 20, 22 in the following manner.

First, the valve 22 is closed and the valve 21, 20 is opened and the valve 13 is opened to evacuate the interior of the insulator body 2 to become a predetermined pressure of only 0.1 . . . 0.5 bar. The pressure can be monitored by a pressure gauge 14. When the predetermined pressure has been obtained within the insulator body 2 the valve 13 is closed.

On the other hand, as also indicated in FIG. 3b, a closing lid 16 with a valve 17 is connected through a pipe 18 with a device which supplies pressurized air or $N_2$, e.g. from a $N_2$ bottle. A predetermined pressure of 2 to 3 bar is applied as a compression pressure into the container 15.

After the vacuum has been obtained within the insulator body 2 and the valve 13 has been closed, the valves 21, 22 are opened and the insulating compound 3.2, e.g. the cross-linking compound is pressed into the interior of the insulator body 2 to be mixed with the solid particles 3.1 already provided therein. During this process the insulating compound 3.2 is partially sucked into the insulator body 2 by the vacuum inside the insulator body 2 and is partially pressed by the pressure applied to the insulating fluid 3.2 within the container 15.

Thus, in very short time, e.g. one to two minutes, a suspension is formed within the insulator body 2 and, the cross-linking process starts in step S23. During the cross linking process the material cross-links and spreads at least the solid particles and preferably also the insulator body interior walls, the base plate 11 surface and the cable insulation. As explained above, for example if the insulating compound is a cross-linkable material, it is not necessary to add heat because the material may cross-link by itself over time. To end the insertion process eventually the valve 20 connected to the connector 20.1 is closed. Thus, the outdoor termination OT is completed.

Another embodiment of the filling method is described hereinafter. In this embodiment it is not necessary to use a vacuum in the outdoor termination, i.e. within the insulator body 2. It is only necessary to use a pressure in the container 15. However, it must still be guaranteed that there is a good wetting of the particles 3.1 by the insulating compound 3.2. Thus, the filling time must be sufficiently long, e.g. 30 to 60 minutes. Since the flow resistance of the particles 3.1 inside the insulator body 2 continuously increases with increasing filling duration, in accordance with the present embodiment it is provided that the filling pressure is continuously increased with increasing filling duration.

One possibility to achieve this continuously increasing pressure is to use a regulating means which gradually increases the pressure applied to the filling fluid inside the container 15. Another possibility is to use a pre-flow resistance which causes a continuous flow. This pre-flow resistance can for example be formed by the tube 23 if its free cross section is suitably dimensioned.

On the other hand, in accordance with yet another embodiment of the invention, it is also possible to only use the vacuum sucking of the material and to not apply a pushing pressure at the container 15. Thus, depending on the suitably adjusted flow resistance of the tube 23 (and possibly also of the other flow parts), the material can be sucked into the insulator body interior merely by the vacuum pressure.

As explained above, the outdoor termination and the manufacturing method for an outdoor termination can be used for AC and DC high voltage cables. It provides the major advantage of reducing the costs, because the amount of insulating fluid can be reduced due to the provision of the solid particles. There is no need for complicated seals at the upper and lower portion of the insulator body.

Furthermore, various modifications and variations may be carried out on the basis of the teachings contained herein. In particular, the invention can comprise embodiments which consists of features and steps which have been separately described in the description and/or claimed in the claims.

Reference numerals in the claims only serve clarification purposes and do not limit the scope of these claims.

What is claimed is:

1. An outdoor termination for a high voltage cable, comprising:
    a) an insulator body for receiving the high voltage cable; and
    b) a filling compound provided within the insulator body and filling at least a portion of the space between the insulator body interior walls and a cable insulation;
    wherein said filling compound comprises a mixture of particles and an insulating compound; and
    said insulating compound being a crosslinked polymeric material with a DIN ISO 2137 hardness of 200 to 500 mm/10.

2. An outdoor termination according to claim 1, wherein the material of said particles is selected from the group consisting of polyethylene, polyvinylchloride (PVC) rubber, glass and porcelain.

3. An outdoor termination according to claim 1, wherein said particles have a grain-, pellet-, or ball-like shape.

4. An outdoor termination according to claim 3, wherein said grain-, pellet-, or ball-like shaped particles have a diameter between 1 and 5 mm.

5. An outdoor termination according to claim 1, further comprising:
    electric field control means arranged within the insulator body and adapted to control the electric field around a cable core; and wherein
    said filling compound is provided within the insulator body and filling at least a portion of the space between the insulator body interior walls, the cable core and the electric field control means.

6. An outdoor termination according to claim 1, wherein the specific gravity of the particles is substantially equal or greater than the specific gravity of an insulation fluid.

7. An outdoor termination according to claim 1, wherein said particles are electrically conducting and have a predetermined dielectric constant.

8. An outdoor termination according to claim 7, wherein said particles are made from conductive polyethylene.

9. An outdoor termination according to claim 1, wherein said insulator body is made from thermoplastic material, porcelain or a composite insulator material.

10. A method for making an outdoor termination for a high voltage cable comprising the following steps:
    a) preparing an insulator body for receiving the high voltage cable;

b) inserting a filling material into the insulator body to fill at least a portion of the space between the insulator body interior walls and cable insulation said filling material being prepared as a mixture of solid particles and an insulating compound and further comprising:
  c) inserting said solid particles in said insulator body in a first step; and
  d) inserting said insulating compound into the insulator body in a second step, wherein said solid particles and said insulating compound are mixed and said insulating compound is cross-linked; and wherein said insulating compound is a crosslinked polymeric material with a DIN ISO 2137 hardness of 200 to 500 mm/10.

11. A method according to claims 10, wherein said insulating compound is an addition-curable compound capable of being cross-linked.

12. A method according to claim 10, wherein said insulating compound is a two component silicone rubber material capable of being cross-linked.

* * * * *